(12) United States Patent  
Matsuoka (10) Patent No.: US 9,007,308 B2
(45) Date of Patent: Apr. 14, 2015

(54) ADAPTIVE KEYBOARD LIGHTING (75) Inventor: Yoshimichi Matsuoka, Cupertino, CA (US)

(73) Assignee: Google Inc., Mountain View, CA (US)

(*) Notice: Subject to any disclaimer, the term of this patent is extended or adjusted under 35 U.S.C. 154(b) by 173 days.

(21) Appl. No.: 13/566,205

(22) Filed: Aug. 3, 2012

(65) Prior Publication Data

US 2014/0035818 A1 Feb. 6, 2014

(51) Int. Cl.
*G06F 3/02* (2006.01)
*G09G 5/00* (2006.01)
*G06F 1/32* (2006.01)
*G06F 3/01* (2006.01)

(52) U.S. Cl.
CPC ............ *G06F 1/3231* (2013.01); *G06F 1/3271* (2013.01); *G06F 3/013* (2013.01); *Y02B 60/1257* (2013.01); *Y02B 60/1289* (2013.01)

(58) Field of Classification Search
None
See application file for complete search history.

(56) References Cited

U.S. PATENT DOCUMENTS

| 6,725,064 | B1 * | 4/2004 | Wakamatsu et al. | 455/566 |
| 2003/0212811 | A1 * | 11/2003 | Thornton | 709/231 |
| 2005/0073446 | A1 * | 4/2005 | Lazaridis et al. | 341/22 |
| 2005/0199783 | A1 | 9/2005 | Wenstrand et al. | |
| 2007/0296701 | A1 * | 12/2007 | Pope et al. | 345/168 |
| 2008/0141049 | A1 * | 6/2008 | Hassan et al. | 713/320 |
| 2009/0146848 | A1 * | 6/2009 | Ghassabian | 341/22 |
| 2009/0179864 | A1 * | 7/2009 | Rudolph et al. | 345/170 |
| 2010/0141458 | A1 * | 6/2010 | Chiang | 340/600 |
| 2010/0182243 | A1 * | 7/2010 | Singh et al. | 345/169 |
| 2010/0238120 | A1 * | 9/2010 | Hsieh | 345/170 |
| 2010/0265183 | A1 * | 10/2010 | Mail et al. | 345/168 |
| 2010/0302169 | A1 * | 12/2010 | Pance et al. | 345/170 |
| 2011/0006686 | A1 * | 1/2011 | Chen et al. | 315/84 |
| 2012/0133754 | A1 | 5/2012 | Lee et al. | |
| 2012/0288139 | A1 * | 11/2012 | Singhar | 382/103 |

FOREIGN PATENT DOCUMENTS

WO 2014022142 A1 2/2014

OTHER PUBLICATIONS

International Search Report and Written Opinion for PCT Application No. PCT/US2013/051564, mailed on Oct. 8, 2014, 8 pages.
International Preliminary Report on Patentability for International Application No. PCT/US2013/051564, mailed Feb. 12, 2015, 7 pages.

* cited by examiner

*Primary Examiner* — Antonio Xavier
(74) *Attorney, Agent, or Firm* — Brake Hughes Bellermann LLP (57) ABSTRACT

A method for managing backlight illumination of a keyboard that is coupled to an electronic device or computer system includes placing backlights illuminating the keyboard in an on-state or an off-state according to a direction of the user's eyesight relative to the keyboard, a use state of the keyboard, and a state of a display presented to the user by the electronic device or computer system to receive input via keyboard entry. The method includes turning off at least one backlight if the user's eyesight is directed away the keyboard, if the keyboard is not in use, or if the display does not include an input element for receiving input via keyboard entry.

25 Claims, 10 Drawing Sheets

ADAPTIVE KEYBOARD LIGHTING

TECHNICAL FIELD

This description relates to lighting of computer input devices such as keyboards.

BACKGROUND

Touch-activated input devices (e.g., keyboards, keypads, mice, track pads, etc.) (hereinafter "keyboards") are commonly used for interacting with electronic devices and computer systems. The electronic devices and computers may be used in poor ambient light conditions. The touch-activated input devices can be artificially illuminated to help users see the devices in the poor ambient light conditions. For example, some commercially-available computer devices (e.g., laptops) are provisioned with lighted or illuminated keyboards ("illuminated keyboards"). An illuminated keyboard may include electronic light sources (e.g., LEDs) disposed, for example, on the sides or back of the keyboard, to provide backlight that illuminates the keys. The illuminated keyboard may be coupled to an ambient light sensor (ALS) which can automatically switch on the light sources when the ambient light falls below a certain threshold. The electronic light sources (e.g., LEDs) may be battery-powered.

While illuminated keyboards can increase the utility of electronic devices and computer systems by allowing interactive use in the dark or in low light conditions, the electronic light sources used in the illuminated keyboards consume power and can run down batteries.

Consideration is now being given to ways of managing power consumption by illuminated keyboards.

SUMMARY

In a first general aspect, a system for managing illumination of a keyboard, which is coupled to an electronic device or computer system, includes a light source controller that configured to place light sources ("backlights") that illuminate the keyboard in an on-state or an off-state according a direction of the user's eyesight relative to the keyboard. The direction of the user's eyesight relative to the keyboard is determined using an imaging device (e.g., a camera). The imaging device includes an image processing unit, which is configured to analyze images of the user's face to track a direction of the user's eyesight. The light source controller turns on or keeps on at least one backlight illuminating the keyboard if the user's eyesight is directed toward the keyboard. The light source controller, conversely, turns off or keeps off at least one backlight illuminating the keyboard if the user's eyesight is directed away from the keyboard. The light source controller can keep on at least one backlight for illuminating a function key or an arrow key in the keyboard even if the user's eyesight is directed away from the keyboard.

In another aspect, the system can include circuitry to determine a use state of the keyboard. The light source controller turns on or keeps on at least one backlight illuminating the keyboard if the keyboard is in use.

In a further aspect, the system can include circuitry to determine if a display presented to the user by the electronic device or computer system includes an input element configured to receive a keyboard entry. The light source controller turns off at least one backlight illuminating the keyboard if the display presented to the user does not include an input element configured to receive a keyboard entry.

In a general aspect, a microprocessor-implemented method for managing backlight illumination of a keyboard, which is coupled to an electronic device or computer system, includes determining a direction of a user's eyesight relative to the keyboard and placing backlights illuminating the keyboard in an on-state or an off-state according to a direction of the user's eyesight relative to the keyboard. The direction of user's eyesight relative to the keyboard may be determined by carrying out an analysis of images of the user's face (e.g., at least the eye portions of the user's face) to track a direction of the user's eyesight. The images of the user's face can be obtained by a camera disposed on the electronic device or computer system. Placing backlights illuminating the keyboard in an on-state or an off-state includes turning on or keeping on at least one backlight if the user's eyesight is directed toward the keyboard, and conversely turning off at least one backlight if the user's eyesight is directed away the keyboard. In a further aspect, the method includes keeping on at least one backlight for illuminating a function key or an arrow key even if the user's eyesight is directed away from the keyboard.

In another aspect, the method includes determining a use state of the keyboard and turning off at least one backlight illuminating the keyboard if the keyboard is in not in use. In yet another aspect, the method includes determining if a display presented to the user by the electronic device or computer system includes an input element configured to receive a keyboard entry, and turning off at least one backlight illuminating the keyboard if there is no such input element displayed.

The details of one or more implementations are set forth in the accompanying drawings and the description below. Other features will be apparent from the description and drawings, and from the claims.

BRIEF DESCRIPTION OF THE DRAWINGS

Like reference symbols in the various drawings indicate like elements.

DETAILED DESCRIPTION

Figure 1A:
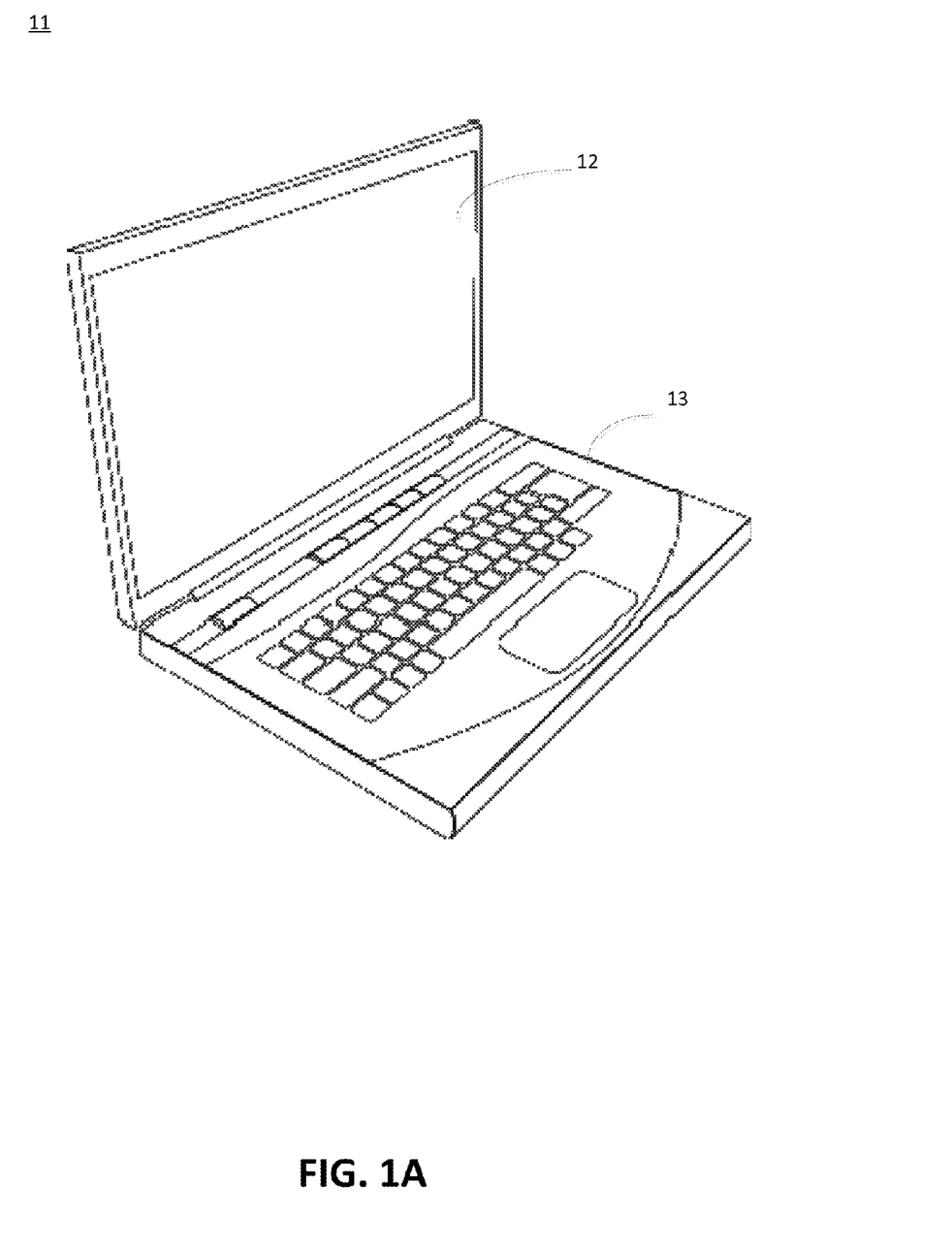
FIG. 1A is schematic illustration of a portable computer (e.g., a laptop computer) with a keyboard.

FIG. 1A shows an example laptop computer 11. Laptop computer 11, which may be battery powered, includes a display 12 and a touch-activated input device (e.g., keyboard 13) through which a user can interact with the computer. The user may, for example, use keyboard 13 to enter commands, instructions, or text for operating laptop computer 11 or applications thereon (e.g., e-mail, word processing, internet browsing applications, etc.). A user may use laptop computer 11, which may be battery powered, as a portable device.

Figure 1B:
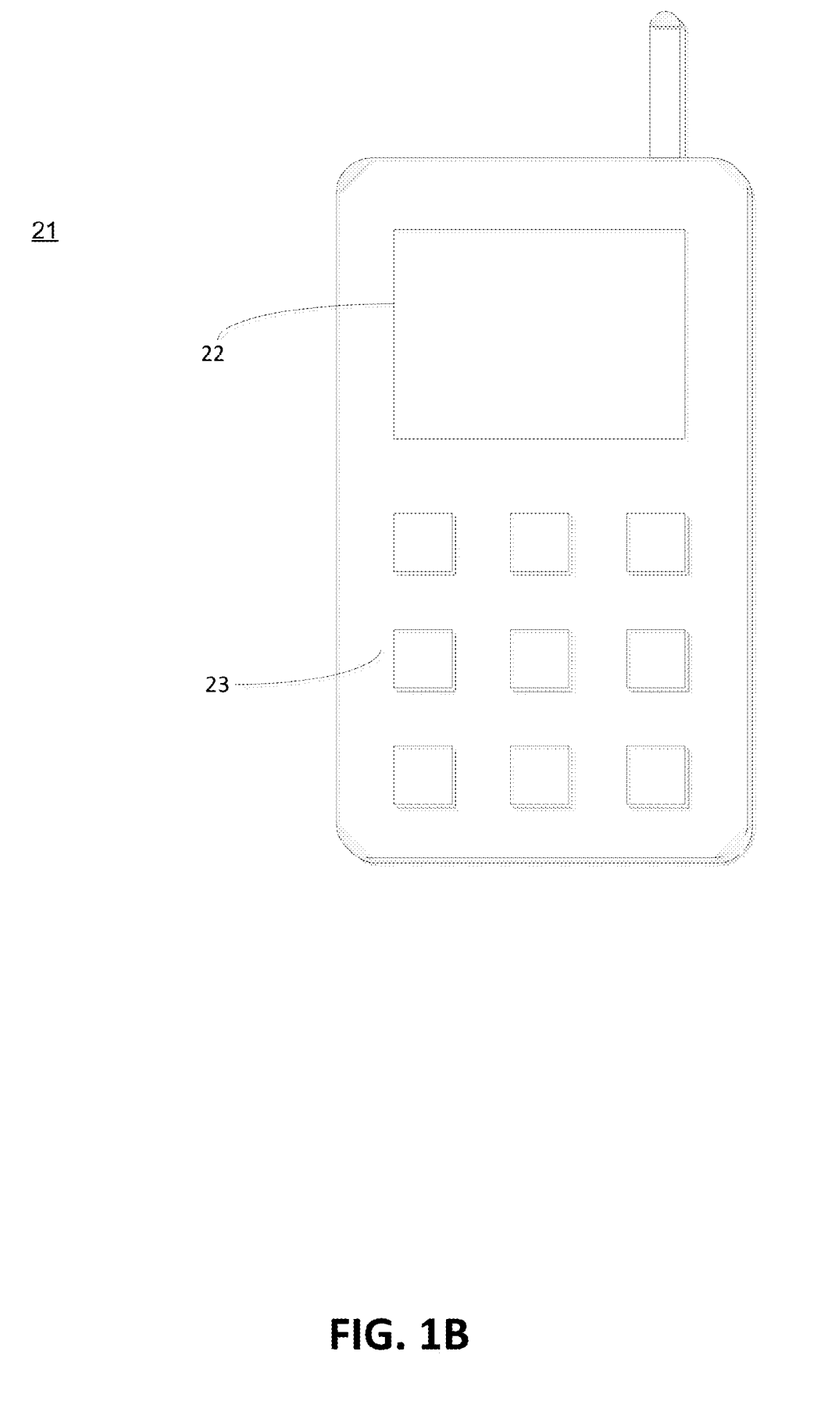
FIG. 1B is schematic illustration of an electronic device (e.g., a mobile phone) with a keypad.

FIG. 1B shows an example electronic device 21. Electronic device 21 may, for example, be a mobile phone built on a mobile computing platform, with computing ability and internet connectivity. Electronic device 21 may include a display 22 and a touch-activated input device (e.g., keypad 23) through which a user can interact with the electronic device 21. The user may use keypad 23, for example, to enter commands, instructions, or text for operating electronic device 21 or applications thereon (e.g., e-mail, texting, internet browser applications, etc.). A user may use electronic device 21, which may be battery powered, as a portable device.

Figure 1C:
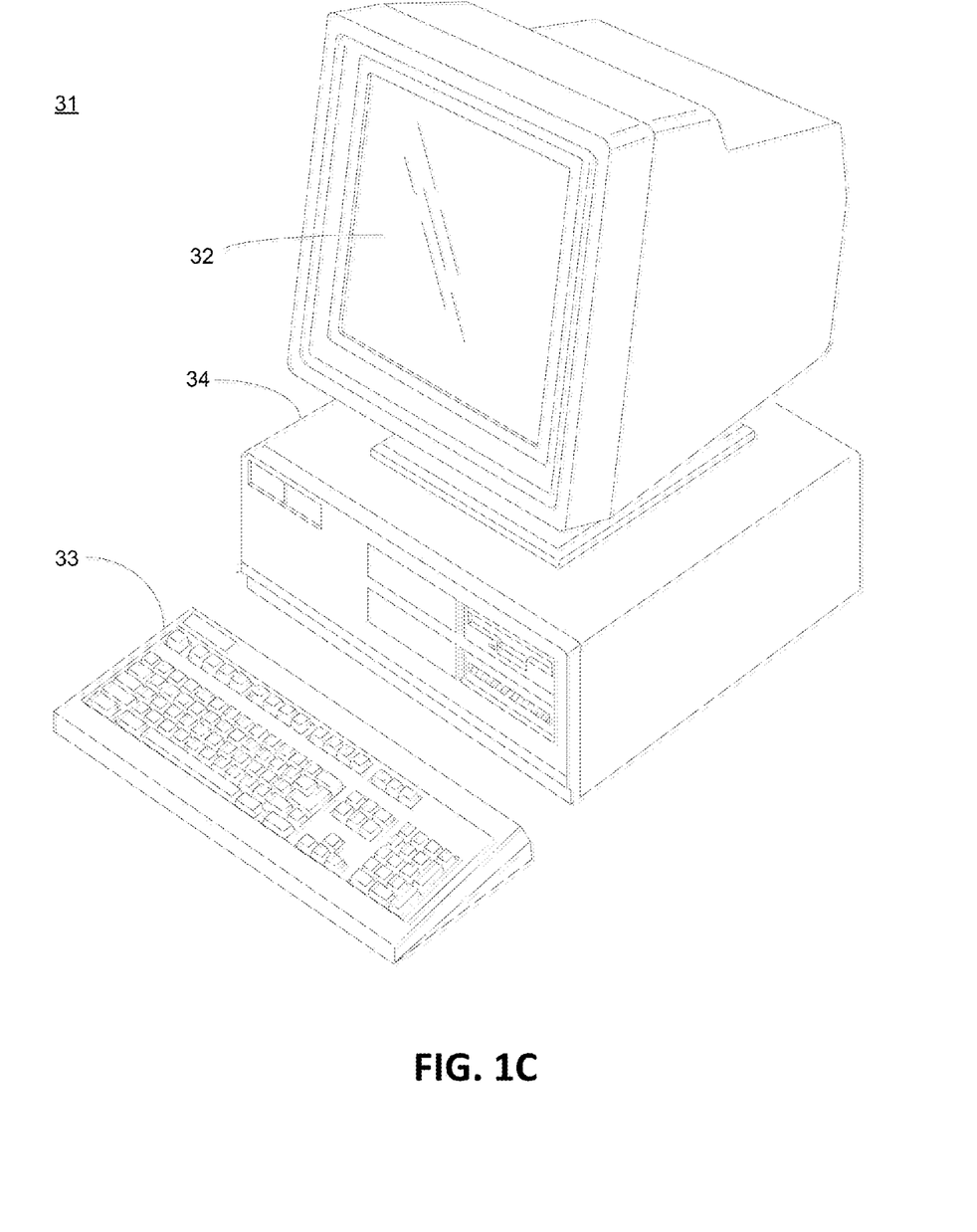
FIG. 1C is schematic illustration of a personal computer system (e.g., a desktop computer) with a keyboard.

FIG. 1C shows an example desktop computer system 31. Computer system 31 may, for example, include a table top display 32, a personal computer 34 (e.g., a desktop computer) and a touch-activated input device (e.g., keyboard 33) through which a user can interact with computer system 31. A user may use keyboard 33 to interact with computer system 31. The user may, for example, use keyboard 33 to enter commands, instructions, or text for operating computer system 31 or applications thereon (e.g., e-mail, word processing, internet browser applications, etc.). Keyboard 33, which may be movable, may be battery powered and may be wire or wirelessly linked to computer system 31.

The touch-activated input devices that are deployed with electronic devices and computer systems may be based on different switch technologies (e.g., dome switches, capacitive switches, Hall Effect switches, mechanical switches, etc.). The touch-activated input devices may have matrices of switches or keys corresponding to any of a variety of different configurations (e.g., functions, shapes, number of keys, etc.) that may be selected by designers or manufacturers of different electronic devices and computer systems. It will be understood that keyboard 13, keypad 23, and keyboard 33 that are shown in FIGS. 1A-1C, respectively, are only examples of possible configurations of keys that the touch-activated input devices may have. Further, it will be understood that all touch-activated input devices may be referred to herein as "keyboards" regardless of the switch technology used or the specific shapes, functions and configurations of keys in the touch-activated input devices.

It will be noted a keyboard may either have a fixed position or a varying position relative to other components of an electronic device or computer system. For example, with reference to FIG. 1A, keyboard 13 may have a fixed position relative to display 12 of laptop computer 11. Further with reference to FIG. 1C, movable keyboard 33 may have a varying position relative to display 32 of desktop computer system 31. However, the position of movable keyboard 33 may be approximated from a design or construction of desktop computer system 31. For example, the position of movable keyboard 33 when in use may be approximated by a working surface area (e.g., desktop surface, user's lap, etc.) in front of, but below, display 32 as shown in the figure.

In addition to the switches or keys, a keyboard may include a control processor and special indicator lights (e.g., "caps lock", "num lock" and "scroll lock" indicator lights) that provide visual feedback on a state of the keyboard. The switches or keys matrix in the keyboard may be wired to inputs of the control processor, which may be configured to process incoming keystroke inputs and send the results via a serial cable (e.g., a keyboard cord) or a wireless link to the electronic device or computer system. The control processor may also control operation of the indicator lights.

A keyboard deployed with an electronic device or computer system may be put to use in poor lighting conditions (e.g., in the dark or in low ambient light conditions) by a user. The user may have difficulty in visually locating individual keys on the keyboard in the poor lighting conditions. The user may attempt to locate or operate individual keys on the keyboard blindly without visual confirmation of their locations. However, such use of the keyboard without visual confirmation of the individual keys' locations is prone to error. To assist the user with visually locating individual keys on the keyboard, the keyboard may be illuminated or lighted.

Figure 2:
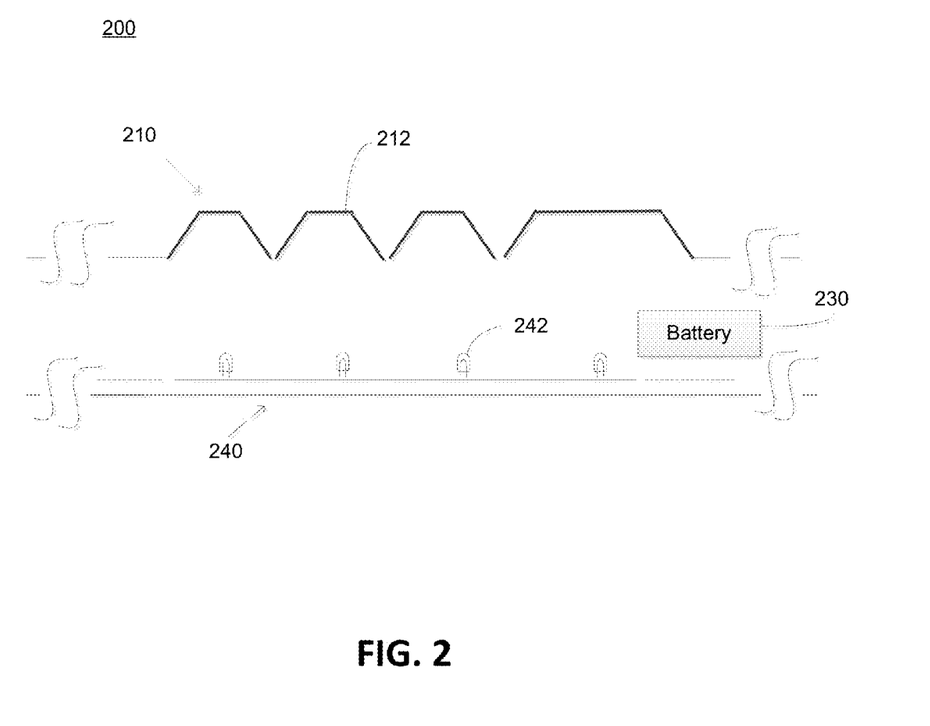
FIG. 2 is a schematic illustration of a lighted or illuminated keyboard. The figure shows a portion of the lighted or illuminated keyboard in cross sectional view.

FIG. 2 shows an example of a lighted or illuminated keyboard 200. In particular, FIG. 2 shows a cross sectional view of a portion of illuminated keyboard 200. Illuminated keyboard 200 may, for example, include a front layer 210 of user-operable keys 212. User-operable keys 212, which may be based on electromechanical switch mechanisms (not shown), may be touch-operable (e.g., by pressing) by a user. Illuminated keyboard 200 may further include a backlight layer 240. Backlight layer 240 may include an array of light sources (e.g., LEDs 242) that are configured to backlight and illuminate one or more keys 212. The light sources in the backlight layer may be referred to as the "backlights" herein. Light generated by LEDs 242 in backlight layer 240 may diffuse through geometrical openings or spaces between keys 212 to front layer 210, or in the case where keys 212 are made of translucent materials the light may diffuse through the translucent materials to front layer 210 to illuminate keys 212.

The array of light sources (e.g., LEDs 242) in backlight layer 240 may be powered by a battery (e.g., battery 230). Battery 230 may be a battery that is housed in keyboard 200 itself or may be a system battery that is housed in an electronic device or computer system to which keyboard 200 is attached.

Figure 3:
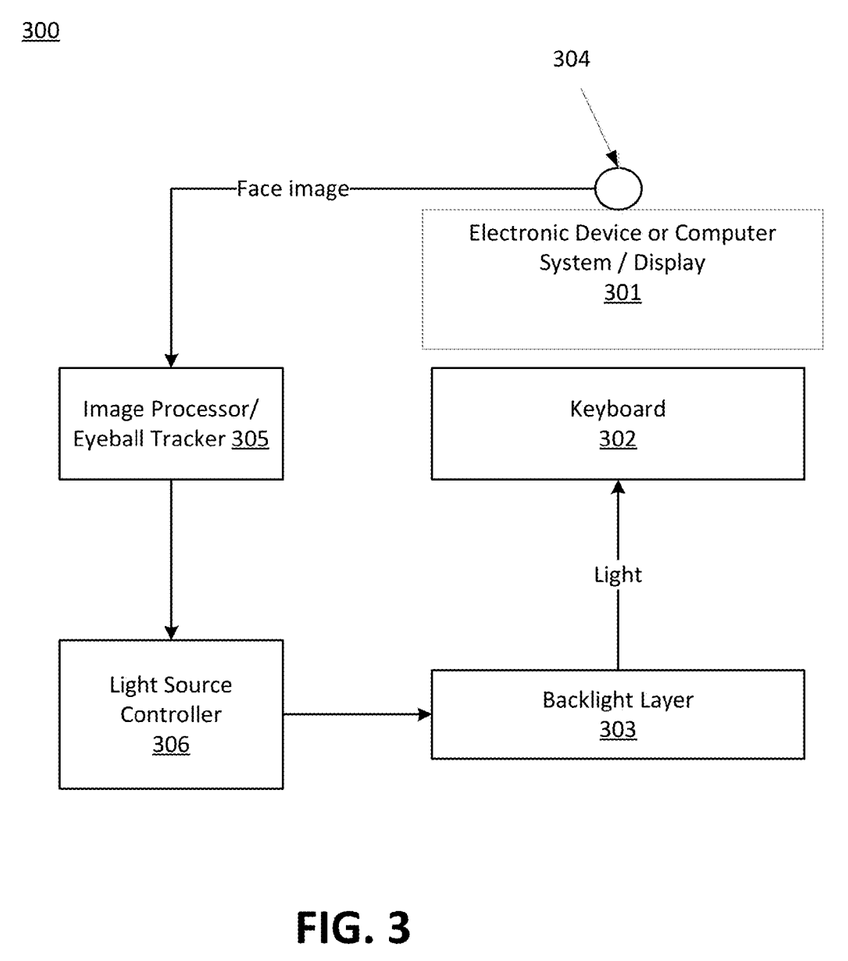
FIG. 3 is a block diagram illustrating an example system for managing power consumption by a lighted or illuminated keyboard, in accordance with the principles of the disclosure herein.

FIG. 3 shows an example system 300 for managing power consumption by a lighted or illuminated keyboard 302 that may be used to interact with an electronic device or computer system 301, in accordance with the principles of the disclosure herein.

Electronic device or computer system 301 may, for example, be a laptop computer, a personal digital assistant, a mobile phone, a smartphone or other computer device. Illuminated keyboard 302, which may serve as a touch-activated input device for electronic device or computer system 301, may be linked to electronic device or computer system 301 via a wired or wireless serial communication link (not shown). Both illuminated keyboard 302 and electronic device or computer system 301 may be powered by a shared battery or by separate internal batteries (not shown). Illuminated keyboard 302 includes a backlight layer 303, which may house an array of one or more light sources (e.g., LEDs) that can provide light for illuminating keys on keyboard 302.

System 300 includes an imaging device (e.g., a camera 304) coupled to an image processing unit (e.g., eyeball tracking unit 305), and a light source controller unit 306 coupled to illuminated keyboard 302. System 300 may be configured to reduce power consumption by keeping light sources in illuminated keyboard 302 in a default off-state and turning them on only when needed, for example, when the keyboard is actually being used or about to be used by a user to interact with electronic device or computer system 301.

It will be noted that, for convenience in description herein, illuminated keyboard 302 and electronic device or computer system 301 are shown in FIG. 3 as separate units. However, it will be understood that illuminated keyboard 302 (including backlight layer 303) may be a touch-activated input device that is an integral part of electronic device or computer system 301 (as shown in FIGS. 1A-1C). Similarly, for convenience in description herein, imaging device 304, eyeball tracking unit 305 and light source controller unit 306 are shown in FIG. 3 as separate units. However, it will be understood that, like keyboard 302, imaging device 304, eyeball tracking unit 305, and light source controller unit 306 may be integral parts of electronic device or computer system 301.

In system 300, imaging device 304 may be a camera attached to or mounted on electronic device or computer system 301. Imaging device 304 may, for example, be a front-facing camera on a mobile phone or a webcam camera (or similar device) mounted on a display of a laptop computer. However, it will be understood that imaging device 304 need not be attached to or mounted on electronic device or computer system 301. In a version of system 300, imaging device 304 may be an imaging device that is not specifically attached to electronic device or computer system 301. Imaging device 304 may, for example, be a wall-mounted camera configured to monitor users in a work area or room. Further, imaging device 304 may be activated automatically, for example, when electronic device or computer system 301 is turned on. Alternatively, imaging device 304 may be activated by a user-operated switch.

Further in system 300, imaging device 304 may be configured to image the face (or at least the eyes) of a user of electronic device or computer system 301, and to periodically or continuously feed the images of the user's face to eyeball tracker unit 305. Imaging device 304 may be a low light camera configured for imaging the user's face under low visible light conditions. Imaging device 304 may, for example, include wide aperture and short focal length optics for imaging the user's face, which may be at a distance of at most a few feet away, under low visible light conditions. Alternatively or additionally, imaging device 304 may include infrared-sensing elements (e.g., CCD elements) to image the user's face in an infrared spectral range (e.g., 700-1000 nm). System 300 may optionally include illumination sources (e.g., infrared diodes), which may illuminate the user's eyes, for example, to generate corneal reflections that can be imaged by imaging device 304.

Eyeball tracker unit 305 may be configured to analyze the images of the user's face received from imaging device 304 to track the user's eye-movements. Eyeball tracker unit 305 may include suitable image recognition processors for this purpose.

Eyeball tracker unit 305 may be configured to track the user's eye movements relative to positions of keyboard 302 and other components of electronic device or computer system 301 (e.g., a display unit or imaging device 304). The geometrical position of keyboard 302 relative to imaging device 304 may be known or approximated from a design or construction of electronic device or computer system 301.

Eyeball tracker unit 305 may be further configured to analyze the tracked eye-movements and determine if the user's eyes are directed toward or are about to be directed toward keyboard 302 (i.e. toward the known or approximated position of keyboard 302.) Conversely, eyeball tracker unit 305 may be configured to analyze the eye-movements to determine if the user's eyes are directed away or are about to be directed away from keyboard 302. Eyeball tracker unit 305 may be configured to determine and communicate a status of a direction of the user's eyesight or gaze (e.g., away from the keyboard, about to be directed to the keyboard, directed to the keyboard, and about to be directed way from the keyboard) to light source controller 306.

Light source controller 306, in system 300, may be integrated with a conventional keyboard control processor which controls operations of keyboard elements including backlight layer 303, or may alternatively be an additional controller unit. Light source controller 306 may be configured to operate light sources in backlight layer 303 according to inputs from one or more sensors (e.g., an ambient light sensor) or user-operated switches. Light source controller 306 may, for example, turn on the light sources in backlight layer 303 when an ambient light sensor (not shown) indicates poor or failing light conditions. Light source controller 306 may be further configured to limit power consumption by the light sources by maintaining the light sources in an on-state or an off-state according to the status of the direction of the user's eyesight, which it may receive from eyeball tracker unit 305. Light source controller 306 may, for example, maintain the light sources in an off-state when the user's eyes are directed away from the keyboard, and place the light sources in an on-state only when the user's eyes are directed or are about to be directed toward the keyboard. Light source controller 306 may revert the light sources to an off-state when the user's eyes are directed or are about to be directed away from the keyboard. In this manner, light source controller 306 may reduce power consumption or draw down of batteries by keeping light sources in illuminated keyboard 302 in an on-state only when needed to help the user to visually confirm key locations on keyboard 302 while interacting with electronic device or computer system 301.

Figure 4:
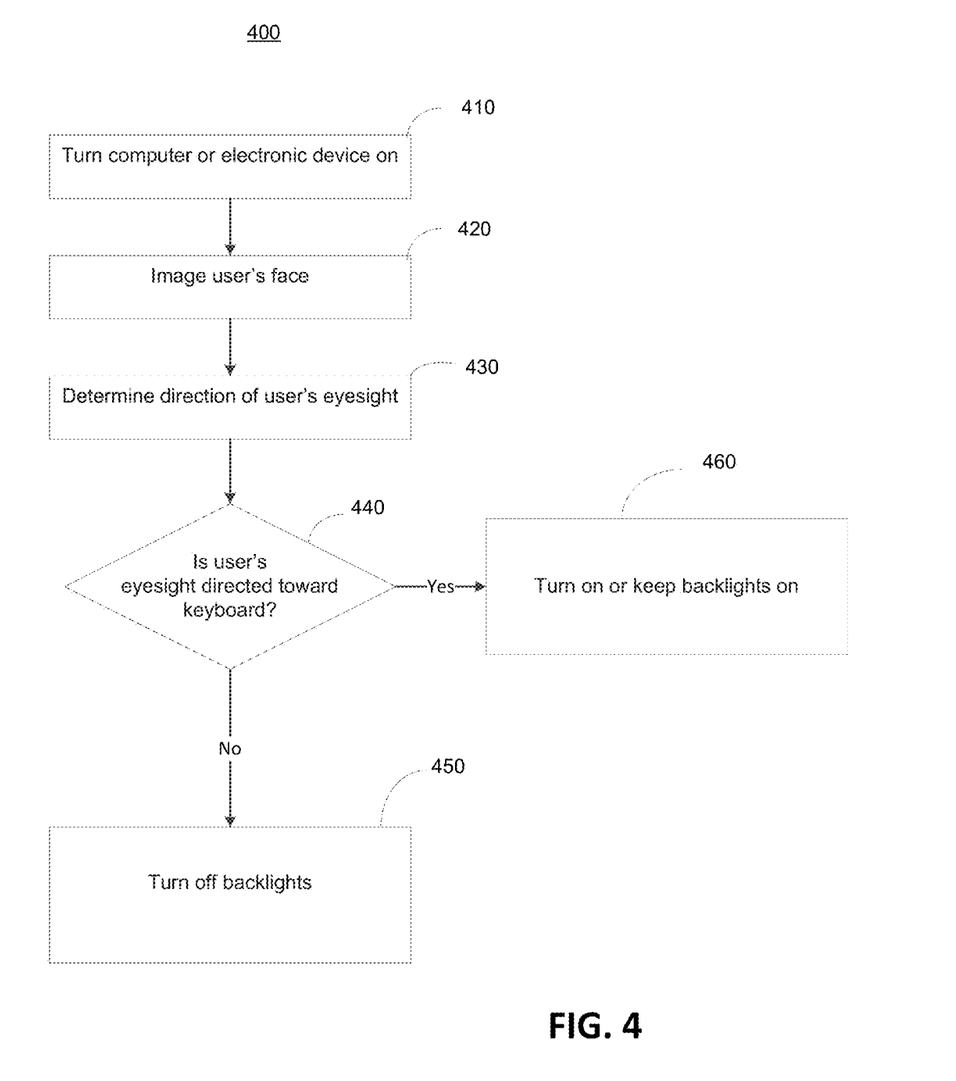
FIG. 4 is a flowchart illustrating another example method for managing power consumption by a lighted or illuminated keyboard, in accordance with the principles of the disclosure herein.

FIG. 4 shows an example process 400 for managing power consumption by light sources in an illuminated keyboard that is coupled to an electronic device or computer system, in accordance with the principles of the disclosure herein.

Process 400 may begin with the electronic device or computer system being turned on (410), for example, by a user. Process 400 includes determining if the user's eyesight is directed toward or away from the illuminated keyboard (440), and accordingly placing light sources ("backlights") illuminating the keyboard in an on-state (460) or an off-state (450). Placing the backlights illuminating the keyboard in an on-state may include turning the backlights on if they are in an off-state. Determining if the user's eyesight is directed toward or away from the illuminated keyboard 440 may include imaging the user's face (420) and analyzing the images of the user's face to track a direction of the user's eyesight (430). Imaging the user's face 420 may include imaging at least eye portions of the user's face.

Process 400 may be implemented, for example, using system 300 (FIG. 3) which includes an imaging device (e.g., camera 304) to obtain images of the user's face and an image processing unit (e.g., eyeball tracker unit 305) configured to analyze the images of the user's face to determine if the user's eyes are directed toward the keyboard. In the electronic device or computer system (e.g., device 301, FIG. 3), which is the subject of process 400, the backlights (backlight 303, FIG. 3) for the keyboard (e.g., keyboard 302, FIG. 3) may be in a default continuously on-state. The backlights may have been placed in the default continuously on-state automatically, for example, in response to poor or failing light conditions detected by an ambient light sensor or in response to an operation of a user-operated switch. Process 400 may be activated to image the user's face 420, and may analyze the facial images to track a direction of the user's eyesight 430 while the backlights may be in the default continuously on-state. Process 400 may keep the backlights in their default on-state or move one or more the backlights to an off-state according to its (process 400's) determination of whether the user's eyesight is directed toward or away from the keyboard.

Figure 5:
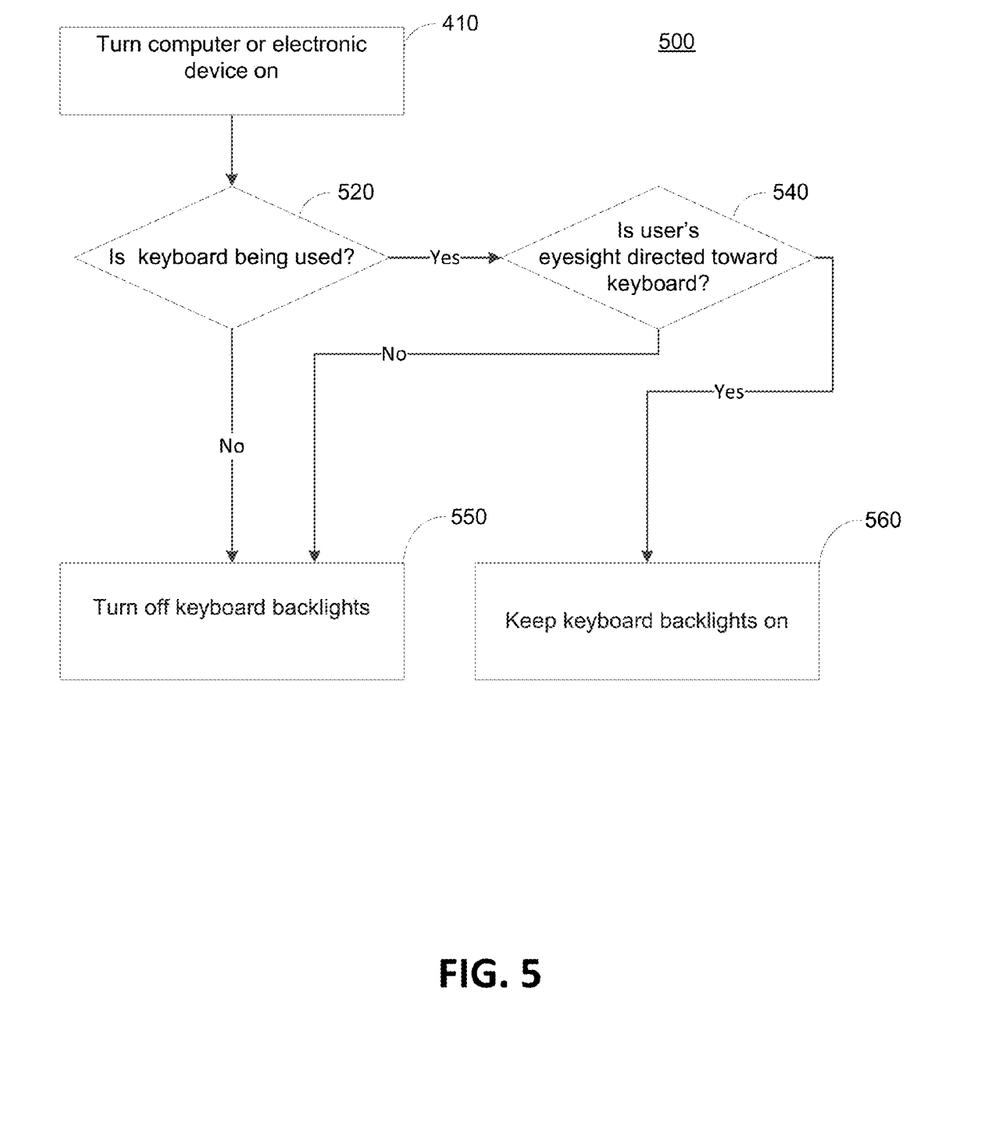
FIG. 5 is a flowchart illustrating yet another example method for managing power consumption by a lighted or illuminated keyboard, in accordance with the principles of the disclosure herein.

FIG. 5 shows another example process 500 for managing power consumption by light sources in an illuminated keyboard that is coupled to an electronic device or computer system, in accordance with the principles of the disclosure herein.

Process 500, like process 400, may begin with the turning on of the electronic device or computer system 410 by a user. Process 500 may further include determining a use state of the keyboard coupled to the electronic device or computer system (520). If the keyboard is not in use, process 500 may include turning the keyboard backlights off (550). If the keyboard is in use, process 500 may further include determining if the user's eyesight is directed toward or away from the keyboard (540), and accordingly keeping the keyboard backlights on (560) or turning the keyboard backlights off 550. Keeping the keyboard backlights on 560 may include turning the backlights on if they are in an off-state.

In process 500 determining if the user's eyesight is directed toward or away from the keyboard 540 may, like in process 400, involve imaging the user's face 420 and analyzing images of the user's face to track a direction of the user's eyesight 430.

Figure 6:
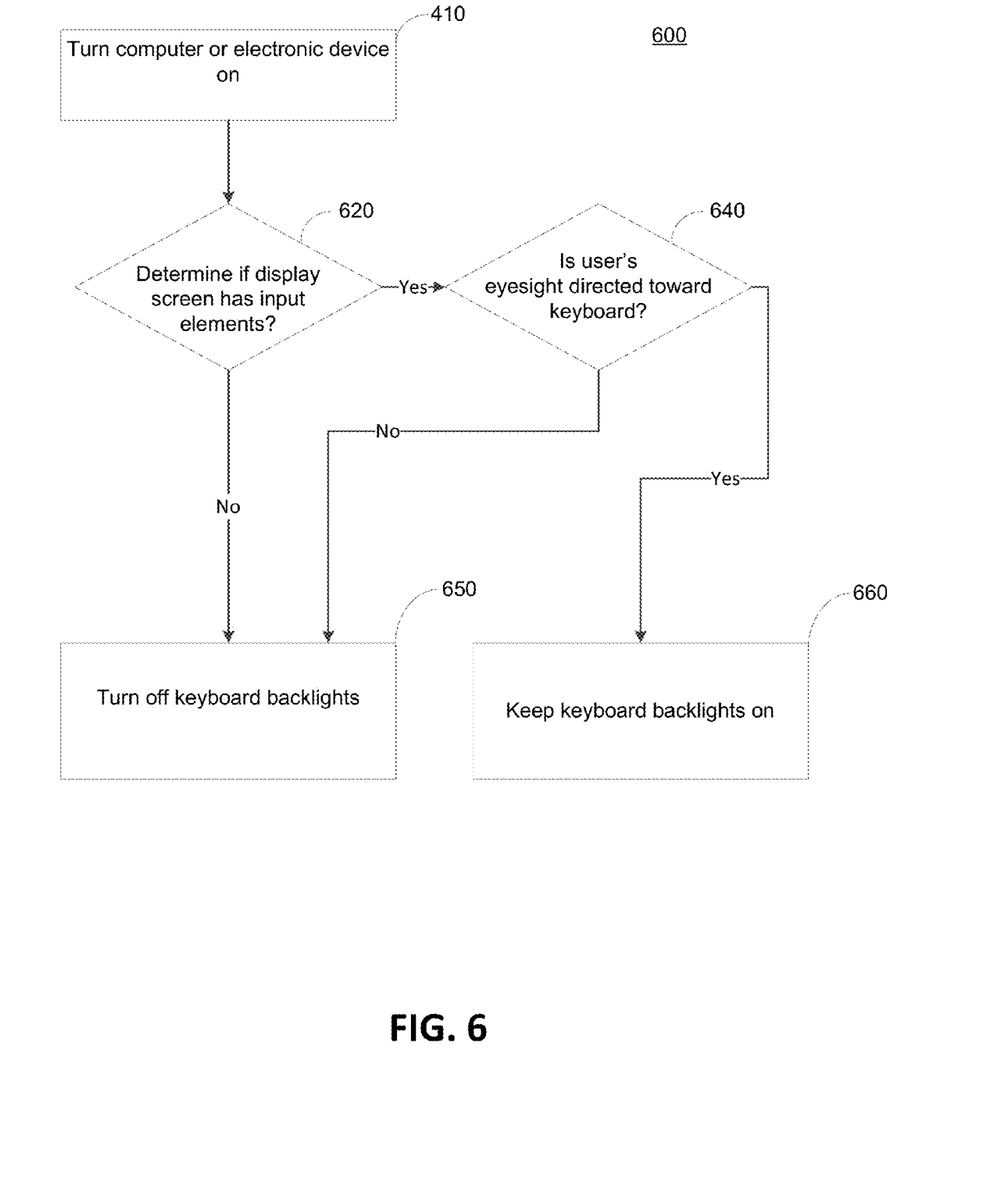
FIG. 6 is a flowchart illustrating yet another example method for managing power consumption by a lighted or illuminated keyboard, in accordance with the principles of the disclosure herein.

FIG. 6 shows another example process 600 for managing power consumption by light sources in an illuminated keyboard that is coupled to an electronic device or computer system, in accordance with the principles of the disclosure herein.

Process 600, like processes 400 and 500, may begin with the turning on of the electronic device or computer system 410 by a user. Process 600 may further include making a determination of whether a display screen presented by the electronic device or computer system to the user includes input elements (e.g., command line interfaces, text-based hyperlinks, or Graphical User Interface (GUI) elements such as text dialog boxes, check boxes, menus, radio buttons, and icons, etc.) that are configured to receive keyboard input or entries (620). If the display screen does not have such input elements, process 600 may include turning off the keyboard backlights (650). If the display screen does have an input element configured to receive keyboard input or entries, process 600 may further include determining if the user's eyesight is directed toward or away from the keyboard (640), and accordingly keeping the keyboard backlights on (660) or turning the keyboard backlights off 650. Keeping the keyboard backlights on 660 may include turning the backlights on if they are in an off-state.

In process 600 determining if the user's eyesight is directed toward or away from the keyboard 640, like in process 400, may involve imaging the user's face 420 and analyzing images of the user's face to track a direction of the user's eyesight 430.

For convenience in description processes 400, 500 and 600 are described as separate processes herein. However, it will be understood that the processes are not mutually exclusive and elements of the processes may be performed individually or in any suitable combination. For example, managing power consumption by turning backlights on or off in a keyboard may involve determining whether a display screen includes input elements (as in process 600) in combination with determining a use state of the keyboard (as in process 500). The backlights may be turned off if either of the determinations is negative.

Figure 7:
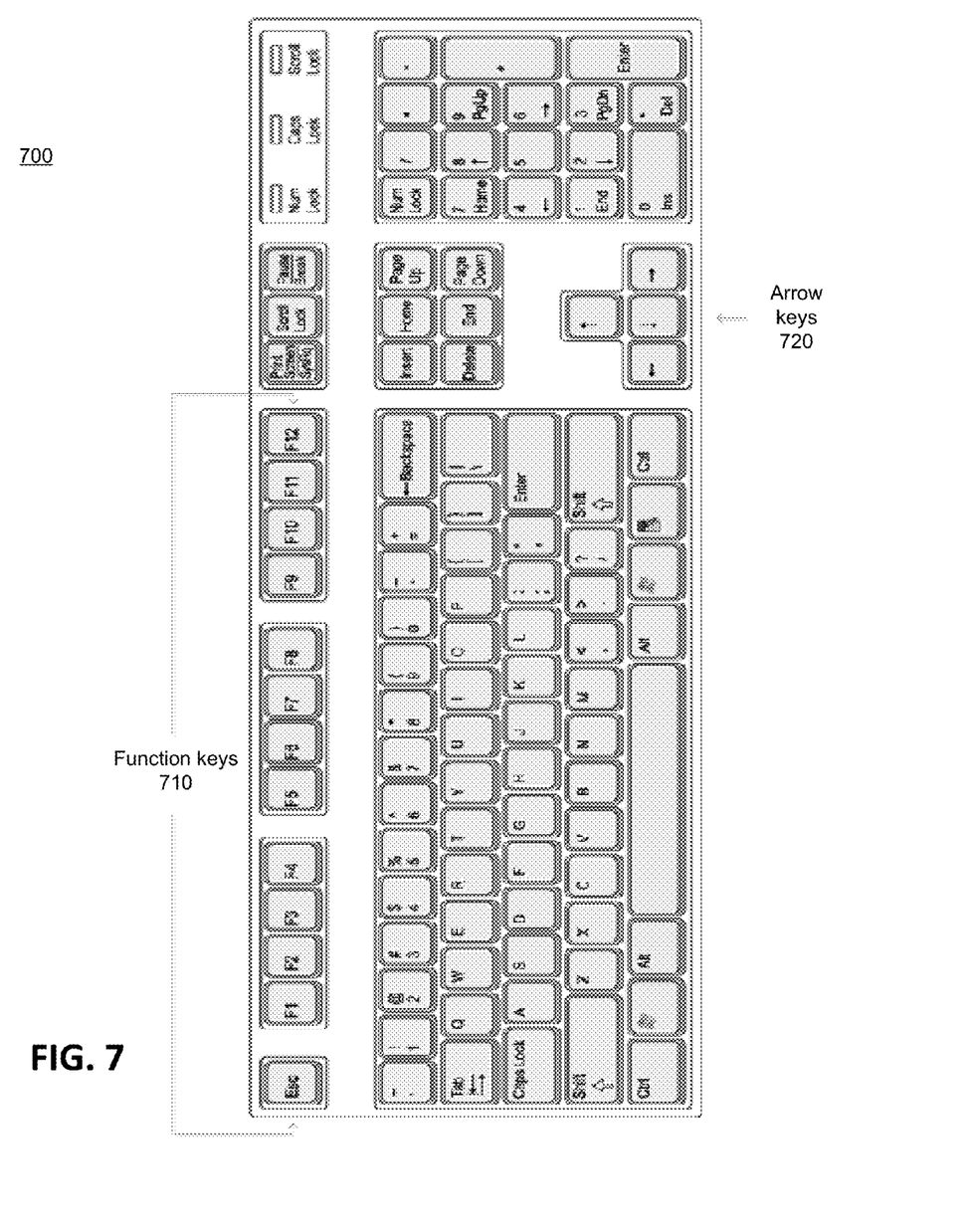
FIG. 7 is an illustration of a keyboard with a standard layout of keys.

It will be further understood that in processes 400-600 turning the keyboard backlights off (450, 550, and 650) may involve turning some but not all of the backlights off. In some implementations of processes 400-600, backlights for select keys or groups of key, which may have useful or important interactive functions even in poor light conditions, may not be turned off. For example, with reference to a standard layout of keys in a keyboard 700 shown in FIG. 7, in processes 400-600 turning the keyboard backlights off (450, 550, and 650) may not turn off backlights illuminating a group of function keys 710 and/or a group of arrow keys 720 even if the user's eyesight is directed away from the keyboard.

It will be further understood that processes 400-600 may be implemented using one or more microprocessor circuits disposed in the electronic device or computer system. The one or more microprocessor circuits may be suitably configured or programmed to perform one or more elements of processes 400-600. For example, the one or more microprocessor circuits may be configured to make a determination of whether a display screen presented by the electronic device or computer system to the user includes input elements (as in process 600) and/or configured to make a determination of a use state of the keyboard (as in process 500).

Figure 8:
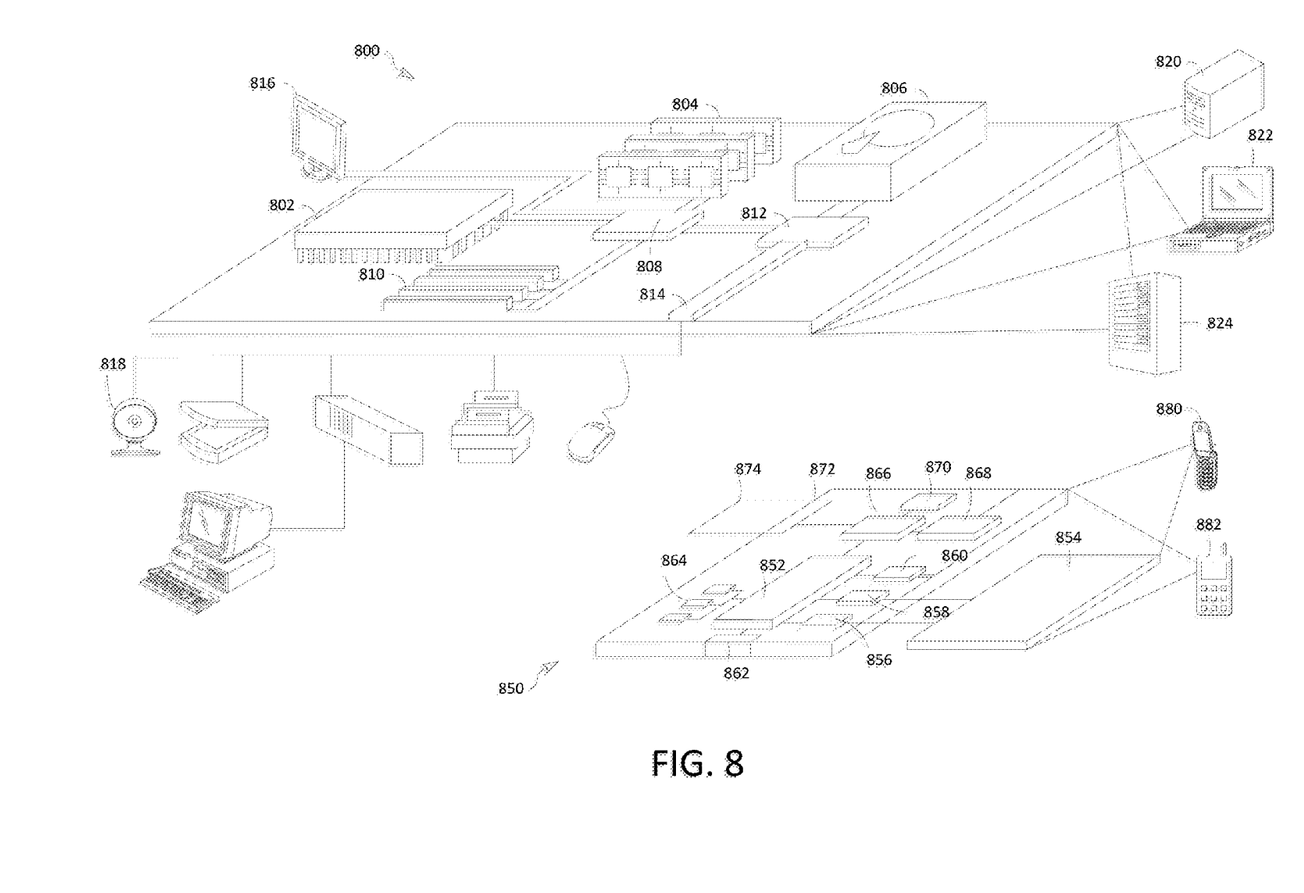
FIG. 8 shows an example of a computer device and a mobile computer device that can be used to implement the systems and methods shown in FIGS. 2-7.

FIG. 8 shows an example of a generic computer device 800 and a generic mobile computer device 850, which may be used with the techniques described in FIGS. 1-7. Computing device 800 is intended to represent various forms of digital computing devices, such as laptop computers, desktop computers, tablet computers, televisions, workstations, personal digital assistants, servers, blade servers, mainframes, and other appropriate computers. Computing device 850 is intended to represent various forms of mobile devices, such as personal digital assistants, cellular telephones, smart phones, and other similar computing devices. The components shown here, their connections and relationships, and their functions, are meant to be exemplary only, and are not meant to limit implementations of the inventions described and/or claimed in this document.

Computing device 800 includes a processor 802, memory 804, a storage device 806, a high-speed interface 808 connecting to memory 804 and high-speed expansion ports 810, and a low speed interface 812 connecting to low speed bus 814 and storage device 806. Each of the components 802, 804, 806, 808, 810, and 812, are interconnected using various busses, and may be mounted on a common motherboard or in other manners as appropriate. The processor 802 can process instructions for execution within the computing device 800, including instructions stored in the memory 804 or on the storage device 806 to display graphical information for a GUI on an external input/output device, such as display 816 coupled to high speed interface 808. In other implementations, multiple processors and/or multiple buses may be used, as appropriate, along with multiple memories and types of memory. The display can include, for example, a TFT LCD (Thin-Film-Transistor Liquid Crystal Display) or an OLED (Organic Light Emitting Diode) display, or other appropriate display technology that includes a backlight for providing light to a portion of the display that includes pixels having variable transmissivities.

Also, multiple computing devices 800 may be connected, with each device providing portions of the necessary operations (e.g., as a server bank, a group of blade servers, or a multi-processor system).

The memory 804 stores information within the computing device 800. In one implementation, the memory 804 is a volatile memory unit or units. In another implementation, the memory 804 is a non-volatile memory unit or units. The memory 804 may also be another form of computer-readable medium, such as a magnetic or optical disk.

The storage device 806 is capable of providing mass storage for the computing device 800. In one implementation, the storage device 806 may be or contain a computer-readable medium, such as a floppy disk device, a hard disk device, an optical disk device, or a tape device, a flash memory or other similar solid state memory device, or an array of devices, including devices in a storage area network or other configurations. The computer program product may also contain instructions that, when executed, perform one or more methods, such as those described above. The information carrier is a computer- or machine-readable medium, such as the memory 804, the storage device 806, or memory on processor 802.

The high speed controller 808 manages bandwidth-intensive operations for the computing device 800, while the low speed controller 812 manages lower bandwidth-intensive operations. Such allocation of functions is exemplary only. In one implementation, the high-speed controller 808 is coupled to memory 804, display 816 (e.g., through a graphics processor or accelerator), and to high-speed expansion ports 810, which may accept various expansion cards (not shown). In the implementation, low-speed controller 812 is coupled to storage device 806 and low-speed expansion port 814. The low-speed expansion port, which may include various communication ports (e.g., USB, Bluetooth, Ethernet, wireless Ethernet) may be coupled to one or more input/output devices, such as a keyboard, a pointing device, a scanner, an imaging device (e.g., web cam 818) or a networking device such as a switch or router, e.g., through a network adapter.

The computing device 800 may be implemented in a number of different forms, as shown in the figure. For example, it may be implemented as a standard server 820, or multiple times in a group of such servers (such as map servers, transit data servers, etc.). It may also be implemented as part of a rack server system 824. In addition, it may be implemented in a personal computer such as a laptop computer 822. Alternatively, components from computing device 800 may be combined with other components in a mobile device, such as device 850. Each of such devices may contain one or more of computing device 800, 850, and an entire system may be made up of multiple computing devices 800, 850 communicating with each other.

Computing device 850 includes a processor 852, memory 864, an input/output device such as a display 854, a communication interface 866, and a transceiver 868, among other components. The device 850 may also be provided with a storage device, such as a microdrive or other device, to provide additional storage. Each of the components 850, 852, 864, 854, 866, and 868, are interconnected using various buses, and several of the components may be mounted on a common motherboard or in other manners as appropriate.

The processor 852 can execute instructions within the computing device 850, including instructions stored in the memory 864. The processor may be implemented as a chipset of chips that include separate and multiple analog and digital processors. The processor may provide, for example, for coordination of the other components of the device 850, such as control of user interfaces, applications run by device 850, and wireless communication by device 850.

Processor 852 may communicate with a user through control interface 858 and display interface 856 coupled to a display 854. The display 854 may be, for example, a TFT LCD (Thin-Film-Transistor Liquid Crystal Display) or an OLED (Organic Light Emitting Diode) display, or other appropriate display technology. The display interface 856 may comprise appropriate circuitry for driving the display 854 to present graphical and other information to a user. The control interface 858 may receive commands from a user and convert them for submission to the processor 852. In addition, an external interface 862 may be provided in communication with processor 852, so as to enable near area communication of device 850 with other devices. External interface 862 may provide, for example, for wired communication in some implementations, or for wireless communication in other implementations, and multiple interfaces may also be used.

The memory 864 stores information within the computing device 850. The memory 864 can be implemented as one or more of a computer-readable medium or media, a volatile memory unit or units, or a non-volatile memory unit or units. Expansion memory 874 may also be provided and connected to device 850 through expansion interface 872, which may include, for example, a SIMM (Single In Line Memory Module) card interface. Such expansion memory 874 may provide extra storage space for device 850, or may also store applications or other information for device 850. Specifically, expansion memory 874 may include instructions to carry out or supplement the processes described above, and may include secure information also. Thus, for example, expansion memory 874 may be provided as a security module for device 850, and may be programmed with instructions that permit secure use of device 850. In addition, secure applications may be provided via the SIMM cards, along with additional information, such as placing identifying information on the SIMM card in a non-hackable manner.

The memory may include, for example, flash memory and/or NVRAM memory, as discussed below. In one implementation, a computer program product is tangibly embodied in an information carrier. The computer program product contains instructions that, when executed, perform one or more methods, such as those described above. The information carrier is a computer- or machine-readable medium, such as the memory 864, expansion memory 874, or memory on processor 852, that may be received, for example, over transceiver 868 or external interface 862.

Device 850 may communicate wirelessly through communication interface 866, which may include digital signal processing circuitry where necessary. Communication interface 866 may provide for communications under various modes or protocols, such as GSM voice calls, SMS, EMS, or MMS messaging, CDMA, TDMA, PDC, WCDMA, CDMA2000, or GPRS, among others. Such communication may occur, for example, through radio-frequency transceiver 868. In addition, short-range communication may occur, such as using a Bluetooth, WiFi, or other such transceiver (not shown). In addition, GPS (Global Positioning System) receiver module 870 may provide additional navigation- and location-related wireless data to device 850, which may be used as appropriate by applications running on device 850.

Device 850 may also communicate audibly using audio codec 860, which may receive spoken information from a user and convert it to usable digital information. Audio codec 860 may likewise generate audible sound for a user, such as through a speaker, e.g., in a handset of device 850. Such sound may include sound from voice telephone calls, may include recorded sound (e.g., voice messages, music files, etc.) and may also include sound generated by applications operating on device 850.

The computing device 850 may be implemented in a number of different forms, as shown in the figure. For example, it may be implemented as a cellular telephone 880. It may also be implemented as part of a smart phone 882, personal digital assistant, tablet computer, or other similar mobile device.

Various implementations of the systems and techniques described here can be realized in digital electronic circuitry, integrated circuitry, specially designed ASICs (application specific integrated circuits), computer hardware, firmware, software, and/or combinations thereof. These various implementations can include implementation in one or more computer programs that are executable and/or interpretable on a programmable system including at least one programmable processor, which may be special or general purpose, coupled to receive data and instructions from, and to transmit data and instructions to, a storage system, at least one input device, and at least one output device. For example, a special purpose mapping program may provide routing options based on geographic searches entered by a user, and may utilize map data and other data (e.g., transit data, weather data) provided by one or more servers or databases connected to device 800, for example.

These computer programs (also known as programs, software, software applications or code) include machine instructions for a programmable processor, and can be implemented in a high-level procedural and/or object-oriented programming language, and/or in assembly/machine language. As used herein, the terms "machine-readable medium" "computer-readable medium" refers to any computer program product, apparatus and/or device (e.g., magnetic discs, optical disks, memory, Programmable Logic Devices (PLDs)) used to provide machine instructions and/or data to a programmable processor, including a non-transitory machine-readable medium that receives machine instructions as a machine-readable signal. The term "machine-readable signal" refers to any signal used to provide machine instructions and/or data to a programmable processor.

To provide for interaction with a user, the systems and techniques described here can be implemented on a computer having a display device (e.g., a CRT (cathode ray tube) or LCD (liquid crystal display) monitor) for displaying information to the user and a keyboard and a pointing device (e.g., a mouse or a trackball) by which the user can provide input to the computer.

Other kinds of devices can be used to provide for interaction with a user as well; for example, feedback provided to the user can be any form of sensory feedback (e.g., visual feedback, auditory feedback, or tactile feedback); and input from the user can be received in any form, including acoustic, speech, or tactile input. For example, users may touch or swipe a touch-screen to provide input to a device without requiring the use of a keypad, mouse, or pointer.

A number of implementations have been described. Nevertheless, it will be understood that various modifications may be made without departing from the spirit and scope of the invention.

In addition, the logic flows depicted in the figures do not require the particular order shown, or sequential order, to achieve desirable results. In addition, other steps may be provided, or steps may be eliminated, from the described flows, and other components may be added to, or removed from, the described systems. Accordingly, other implementations are within the scope of the following claims.

What is claimed is:

1. A system for managing illumination of a keyboard that is coupled to an electronic device or computer system, the system comprising:
   an imaging device configured to determine a direction of a user's eyesight relative to the keyboard; and
   a light source controller configured to control a plurality of backlights illuminating the keyboard according to the determined direction of the user's eyesight relative to the keyboard, such that, when it is determined that the user's eyesight is directed away from the keyboard, the light source controller is configured to keep on all of the backlights associated with illuminating a predetermined key of the keyboard, or to keep on all of the backlights associated with illuminating a predetermined subset of keys of the keyboard, and to turn off or keep off remaining backlights of the plurality of backlights associated with illuminating remaining keys of the plurality of keys.

2. The system of claim 1, wherein the imaging device includes a camera.

3. The system of claim 1, wherein the imaging device includes an image processing unit.

4. The system of claim 3, wherein the image processing unit is configured to analyze images of the user's face to track a direction of the user's eyesight.

5. The system of claim 1, wherein the light source controller is configured to turn on or keep on at least one backlight illuminating the keyboard if the user's eyesight is directed toward the keyboard.

6. The system of claim 1, wherein the predetermined key is a function key or an arrow key on the keyboard, and the predetermined subset of keys is a plurality of function keys, a plurality of arrow keys or a plurality of numerical pad keys on the keyboard.

7. The system of claim 1, further comprising, circuitry configured to determine a use state of the keyboard, wherein the light source controller is further configured to turn on or keep on at least one backlight illuminating the keyboard if the keyboard is in use.

8. The system of claim 1, further comprising, circuitry configured to determine if a display presented to the user by the electronic device or computer system includes an input element configured to receive a keyboard entry, wherein the light source controller is further configured to turn off at least one backlight illuminating the keyboard if the display presented to the user does not include an input element configured to receive a keyboard entry.

9. A microprocessor-implemented method for managing backlight illumination of a keyboard that is coupled to an electronic device or computer system, the method comprising:
   determining a direction of a user's eyesight relative to the keyboard; and
   placing each of a plurality of backlights illuminating the keyboard in an on-state or an off-state according to the determined direction of the user's eyesight relative to the keyboard, including, when it is determined that the user's eyesight is not directed toward the keyboard:
      keeping on any backlights of the plurality of backlights associated with illuminating a predetermined key of the keyboard; and
      turning off or keeping off any remaining backlights of the plurality of backlights associated with illuminating remaining keys of the plurality of keys.

10. The method of claim 9, wherein determining a direction of a user's eyesight relative to the keyboard includes imaging the user's face and analyzing the images to track a direction of the user's eyesight.

11. The method of claim 10, wherein imaging the user's face includes imaging eye portions of the user's face.

12. The method of claim 10, wherein imaging the user's face includes imaging the user's face with a camera disposed on the electronic device or computer system.

13. The method of claim 10, further comprising:
   determining a use state of the keyboard; and
   if the keyboard is in use, turning on or keeping on at least one backlight illuminating the keyboard.

14. The method of claim 10, further comprising:
   determining if a display presented to the user by the electronic device or computer system includes an input element configured to receive a keyboard entry; and
   if there is no input element configured to receive a keyboard entry displayed, turning off at least one backlight illuminating the keyboard.

15. The method of claim 10, further comprising:
   determining if a display presented to the user by the electronic device or computer system includes an input element configured to receive a keyboard entry; and
   if there is an input element configured to receive a keyboard entry displayed, turning on or keeping on at least one backlight illuminating the keyboard.

16. The method of claim 9, wherein placing each of a plurality of backlights illuminating the keyboard in an on-state or an off-state according to the determined direction of the user's eyesight relative to the keyboard includes turning on or keeping on at least one backlight if the user's eyesight is directed toward the keyboard.

17. The method of claim 9, wherein keeping on any backlights of the plurality of backlights associated with illuminating a predetermined key of the keyboard includes keeping any backlights associated with illuminating a function key or an arrow key of the keyboard even if the user's eyesight is directed away from the keyboard.

18. The method of claim 9, further comprising:
   determining a use state of the keyboard; and
   if the keyboard is not in use, turning off at least one backlight illuminating the keyboard.

19. A microprocessor-implemented method for managing backlight illumination of a keyboard that is coupled to an electronic device or computer system, the method comprising:
   placing each of a plurality of backlights illuminating the keyboard in an on-state or an off-state according to a direction of the user's eyesight relative to the keyboard, including keeping on any backlights of the plurality of backlights associated with illuminating a predetermined key of the keyboard, and turning off or keeping off any remaining backlights of the plurality of backlights, when it is determined that the user's eyesight is not directed toward the keyboard.

20. The method of claim 19, wherein keeping on any backlights of the plurality of backlights illuminating a predetermined key of the keyboard includes keeping on a backlight illuminating a function key or an arrow key of the keyboard even if the user's eyesight is directed away from the keyboard.

21. The method of claim 19, further comprising placing each of the plurality of backlights illuminating the keyboard in an on-state or an off-state according to a use state of the keyboard, including turning off at least one backlight if the keyboard is not in use.

22. The method of claim 19, further comprising placing each of a plurality of backlights illuminating the keyboard in an on-state or an off-state according to a state of a display presented to the user by the electronic device or computer system to receive input via keyboard entry, including turning off at least one backlight if the display does not include an input element for receiving input via keyboard entry.

23. A system for managing illumination of a keyboard that is coupled to an electronic device or computer system, the system comprising:
   a light source controller configured to place one or more backlights illuminating the keyboard in an on-state or an off-state according to a direction of the user's eyesight relative to the keyboard, wherein the light source controller is configured to keep on any backlights of the plurality of backlights illuminating a predetermined subset of keys of the keyboard, and to turn off or keep off any remaining backlights of the plurality of backlights, when it is determined that the user's eyesight is not directed toward the keyboard.

24. The system of claim 23, wherein the light source controller is configured to turn off at least one backlight illuminating the keyboard if the keyboard is not in use.

25. The system of claim 23, wherein the light source controller is configured to turn off at least one backlight illuminating the keyboard if the display does not include an input element for receiving input via keyboard entry.

\* \* \* \* \*